United States Patent
Zhang et al.

(10) Patent No.: US 9,442,830 B1
(45) Date of Patent: Sep. 13, 2016

(54) AUTOMATED TEST COVERAGE ANALYSIS, EXECUTION AND REPORTING

(71) Applicant: EMC Corporation, Hopkinton, MA (US)

(72) Inventors: Zhipeng Zhang, Shanghai (CN); Shouyuan Cheng, Shanghai (CN); Binbin Deng, Shanghai (CN); Bo Wu, Shanghai (CN); Binhua Lu, Shanghai (CN); Scott D. Von Rhee, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 27 days.

(21) Appl. No.: 14/314,411

(22) Filed: Jun. 25, 2014

(51) Int. Cl.
G06F 9/44 (2006.01)
G06F 11/36 (2006.01)
G06F 9/445 (2006.01)
G06F 11/34 (2006.01)

(52) U.S. Cl.
CPC ....... *G06F 11/3688* (2013.01); *G06F 11/3664* (2013.01); *G06F 11/3684* (2013.01); *G06F 9/44589* (2013.01); *G06F 11/3466* (2013.01)

(58) Field of Classification Search
CPC .......... G06F 9/44589; G06F 11/3466; G06F 11/3664; G06F 11/3684; G06F 11/3688
See application file for complete search history.

(56) References Cited

U.S. PATENT DOCUMENTS

| | | | |
|---|---|---|---|
| 6,536,036 B1* | 3/2003 | Pavela | 717/125 |
| 8,539,282 B1* | 9/2013 | Kabanov et al. | 714/38.1 |
| 8,949,670 B1* | 2/2015 | Vemuri et al. | 714/33 |
| 2002/0138510 A1* | 9/2002 | Tan | 707/501.1 |
| 2007/0006046 A1* | 1/2007 | Overman et al. | 714/38 |
| 2009/0019427 A1* | 1/2009 | Li et al. | 717/126 |
| 2009/0105863 A1* | 4/2009 | Bagwell | G06Q 10/06 700/110 |
| 2010/0146340 A1* | 6/2010 | Bhate et al. | 714/38 |
| 2010/0235814 A1* | 9/2010 | Ohta | G06F 11/3684 717/124 |
| 2011/0219359 A1* | 9/2011 | Gupta | 717/124 |
| 2012/0272206 A1* | 10/2012 | Sengupta | G06F 17/2705 717/101 |
| 2013/0091492 A1* | 4/2013 | Mizrahi | 717/124 |
| 2013/0111267 A1* | 5/2013 | Beryoza et al. | 714/32 |
| 2014/0068364 A1* | 3/2014 | Selvaraj | G06F 11/2252 714/737 |
| 2014/0245264 A1* | 8/2014 | Bartley | G06F 8/70 717/124 |
| 2014/0282411 A1* | 9/2014 | Liemandt et al. | 717/124 |
| 2014/0351793 A1* | 11/2014 | Bartley et al. | 717/124 |
| 2015/0026664 A1* | 1/2015 | Bartley et al. | 717/124 |
| 2015/0161026 A1* | 6/2015 | Chan | G06F 11/3676 714/38.1 |

(Continued)

OTHER PUBLICATIONS

Gay et al., "Moving the Goalposts: Coverage Satisfaction is Not Enough", 2014 ACM, SBST'14, Jun. 2014, pp. 19-22; <http://dl.acm.org/citation.cfm?id=2593837&CFID=606297103&CFTOKEN=76910547>.*

(Continued)

*Primary Examiner* — Thuy Dao
*Assistant Examiner* — Ben C Wang
(74) *Attorney, Agent, or Firm* — Muirhead and Saturnelli, LLC

(57) ABSTRACT

Described are techniques for testing software. The techniques may include identifying, at a first point in time, first code that has been modified, identifying, using first mapping information, a testing set of one or more test cases wherein the first mapping information identifies each test case of the testing set as a test case used to test the first code, running the testing set, generating coverage information in accordance with executing; analyzing the coverage information, generating second mapping information in accordance with said analyzing, and updating the first mapping information in accordance with the second mapping information.

17 Claims, 11 Drawing Sheets

(56) References Cited

U.S. PATENT DOCUMENTS

| | | | |
|---|---|---|---|
| 2015/0161028 A1* | 6/2015 | Chan | G06F 11/3676 717/130 |
| 2015/0169435 A1* | 6/2015 | Wu | G06F 11/3684 717/131 |
| 2015/0254173 A1* | 9/2015 | Gupta | G06F 11/3688 714/38.1 |
| 2015/0378874 A1* | 12/2015 | Prasad | G06F 11/3676 717/124 |
| 2016/0019135 A1* | 1/2016 | Gotlieb | G06F 11/3688 717/124 |
| 2016/0085663 A1* | 3/2016 | Best | G06F 11/3684 714/38.1 |

OTHER PUBLICATIONS

Beszédes et al., "Code Coverage-Based Regression Test Selection and Prioritization in WebKit", 2012 IEEE, Sep. 2012, pp. 46-55; <http://ieeexplore.ieee.org/stamp/stamp.jsp?tp=&arnumber=6405252>.*

Tanmoy Sarkar, "Testing database applications using coverage analysis and mutation analysis", Iowa State University, Jan. 2013, pp. 1-87; <http://lib.dr.iastate.edu/cgi/viewcontent.cgi?article=4315& context=etd>.*

* cited by examiner

| Code entity 312 | Test Case 314 |
|---|---|
| Code module1 | Test Case 1 |
| Code module 2 | Test Case 7 |
| .. | .. |

Mapping information 310

AUTOMATED TEST COVERAGE ANALYSIS, EXECUTION AND REPORTING

BACKGROUND

1. Technical Field

This application relates to techniques used in connection with software testing.

2. Description of Related Art

Generally, software testing is performed as part of the software development process. Software testing may be performed, for example, to test a new code module or to test a code modification that adds a new feature or corrects a reported problem. Existing software testing systems may include many test cases. When testing newly added software or modified existing software, one option may be to execute all such test cases. However, this may have a drawback of typically taking an unacceptably long time to complete. Another option is to have a user performing the testing manually select a portion of the test cases to be executed. However, the user performing the testing may not be able to accurately identify the particular test cases that need to be executed to sufficiently test the software modification or newly added software. Additionally, even if all test cases are executed, the particular code that has been added or modified may still not be adequately tested to thereby ensure that any problem purportedly fixed by the code addition or modification is indeed corrected and to also ensure that no new problems have been introduced.

SUMMARY OF THE INVENTION

In accordance with one aspect of the invention is a method of testing software comprising: identifying, at a first point in time, first code that has been modified; identifying, using first mapping information, a testing set of one or more test cases wherein the first mapping information identifies each test case of the testing set as a test case used to test the first code; running the testing set, wherein said running includes executing second code in accordance with the testing set; generating coverage information in accordance with said executing; analyzing the coverage information; generating second mapping information in accordance with said analyzing; and updating the first mapping information in accordance with the second mapping information. The first code may include any of a code module, a routine, a function, multiple code modules, multiple functions, and multiple routines. The coverage information may identify what one or more portions of code are executed in said executing. The second code may include the first code, executing the second code may include executing the first code, and executing the second code may further include executing the second code in accordance with a first test case of the testing set, and wherein the second mapping information indicates that said executing the second code in accordance with the first test case causes execution of at least some of the first code. The second code may not include the first code whereby said executing does not include executing any of the first code, wherein the first mapping information indicates that a first test case should cause execution of the first code, and wherein said executing the second code may further include: executing the second code in accordance with the first test case of the testing set, and wherein the second mapping information indicates that said executing the second code in accordance with the first test case does not cause execution of any of the first code; and wherein said updating may include modifying the first mapping information to generate first modified mapping information that indicates the first test case does not cause execution of the first code. The method may include identifying, at a second point in time subsequent to the first point in time, that the first code that has been further modified; identifying, using the first modified mapping information, a second testing set of one or more test cases wherein the first modified mapping information identifies each test case of the second testing set as a test case used to test the first code, wherein the second testing set does not include the first test case; running the second testing set, wherein said running the second test set includes executing third code in accordance with the second testing set; generating second coverage information in accordance with said executing in accordance with the second testing set; analyzing the second coverage information; generating third mapping information in accordance with said analyzing the second coverage information; and updating the first modified mapping information in accordance with the third mapping information. The first code identified at the first point in time may have been modified by performing any of removing a code portion, adding a new code portion, modifying an existing code portion, and adding a new code entity that is any of a module, routine and function. The method may include identifying any test case of the testing set that failed during said executing. The method may include identifying, in accordance with the second mapping information, at least one code entity of the first code that is not covered by at least one test case whereby the second mapping information indicates that there is no current test case for testing the at least one code entity. At least one code entity of the first code not covered by at least one test case may include a first code entity, and the method may further comprise adding a new test case to test the first code entity. Responsive to said adding, first processing may be performed that includes executing code in accordance with the new test case; generating second coverage information in accordance with said executing in accordance with the new test case; analyzing the second coverage information; generating third mapping information in accordance with said analyzing the second coverage information; and updating the first mapping information in accordance with the third mapping information, said third mapping information identifying the new test as causing execution of the first code entity. The method may include checking in the first code that includes modified code at the first point in time, wherein responsive to said checking in, first processing may be performed, said first processing including: said identifying the testing set; said executing; said generating the coverage information; said analyzing the coverage information; said generating the second mapping information; and said updating the first mapping information. The first mapping information may be included in a mapping repository, the first code and the second code may be included in a code repository, and each of the test cases of the testing set may be retrieved from a test case repository. Executing the second code may include executing the first code, and wherein the first code, when executed, may perform a data storage operation including any of provisioning storage for a logical device and configuring a RAID (redundant array of independent disks) group, and wherein a first test case of the testing set includes one or more inputs used to perform the data storage operation.

In accordance with another aspect of the invention is a system comprising a processor, and a memory comprising code stored therein that, when executed by a processor, performs a method comprising: identifying, at a first point in time, first code that has been modified; identifying, using first mapping information, a testing set of one or more test cases wherein the first mapping information identifies each test case of the testing set as a test case used to test the first code; executing second code in accordance with the testing set; generating coverage information in accordance with said executing; analyzing the coverage information; generating second mapping information in accordance with said analyzing; and updating the first mapping information in accordance with the second mapping information.

In accordance with another aspect of the invention is a non-transitory computer readable medium comprising code stored thereon that, when executed, performs a method comprising: identifying, at a first point in time, first code that has been modified; identifying, using first mapping information, a testing set of one or more test cases wherein the first mapping information identifies each test case of the testing set as a test case used to test the first code; executing second code in accordance with the testing set; generating coverage information in accordance with said executing; analyzing the coverage information; generating second mapping information in accordance with said analyzing; and updating the first mapping information in accordance with the second mapping information. The first code may include any of a code module, a routine, a function, multiple code modules, multiple functions, and multiple routines. The coverage information may identify what one or more portions of code are executed in said executing. The second code may include the first code, executing the second code may include executing the first code, and executing the second code may include executing the second code in accordance with a first test case of the testing set, and wherein the second mapping information indicates that said executing the second code in accordance with the first test case causes execution of at least some of the first code. Executing the second code may include executing the first code, and the first code, when executed, may perform a data storage operation including any of provisioning storage for a logical device and configuring a RAID group, and wherein a first test case of the testing set includes one or more inputs used to perform the data storage operation.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5A and 5B are examples of mapping information that may be used in an embodiment in accordance with techniques herein.

DETAILED DESCRIPTION OF EMBODIMENT(S)

Figure 1:
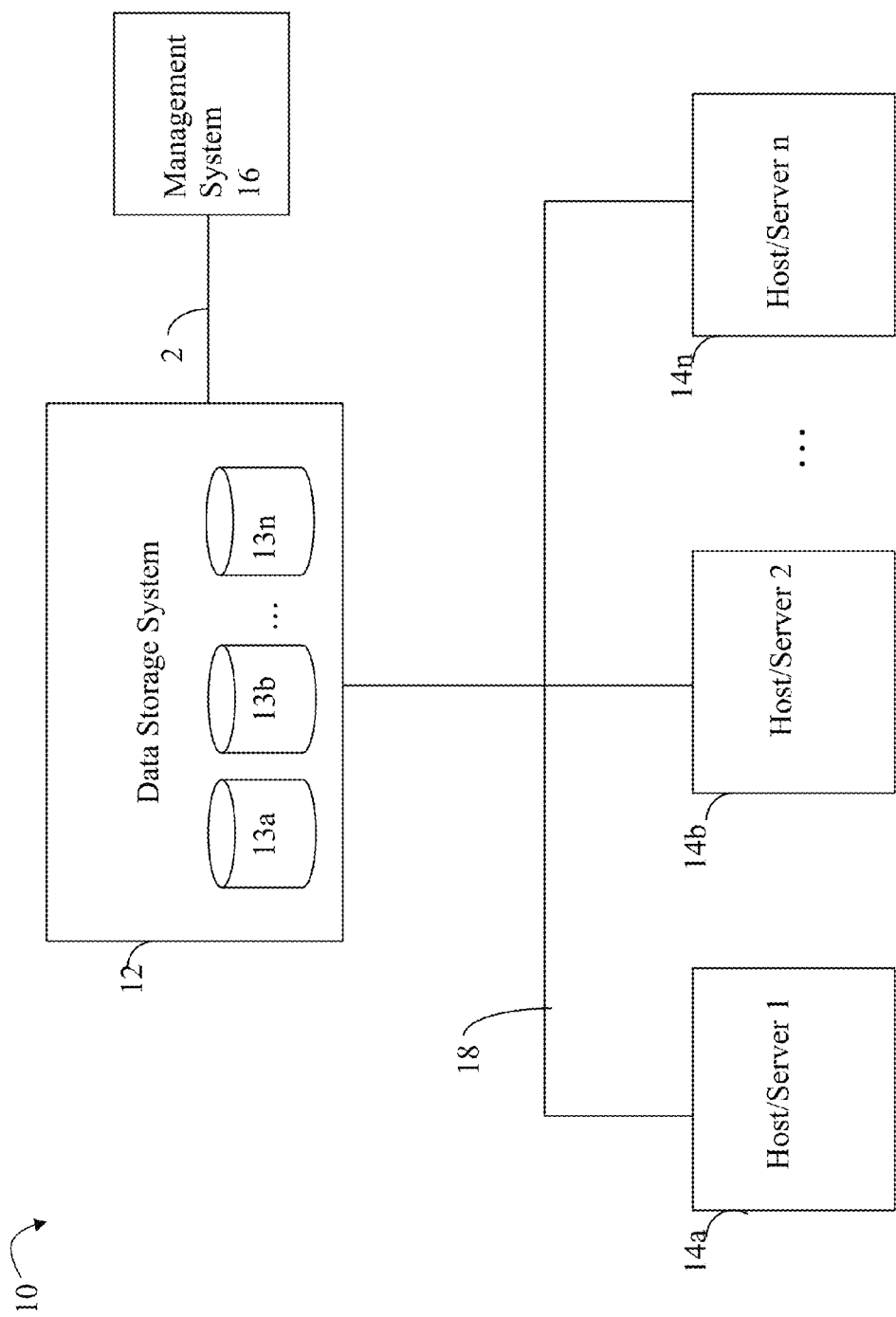
FIGS. 1 and 2 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12. In an embodiment having multiple data storage systems, a first data storage system may also issue reads and/or writes to a second data storage system.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. An LV or LUN may be used to refer to the foregoing logically defined devices or volumes.

Figure 2:
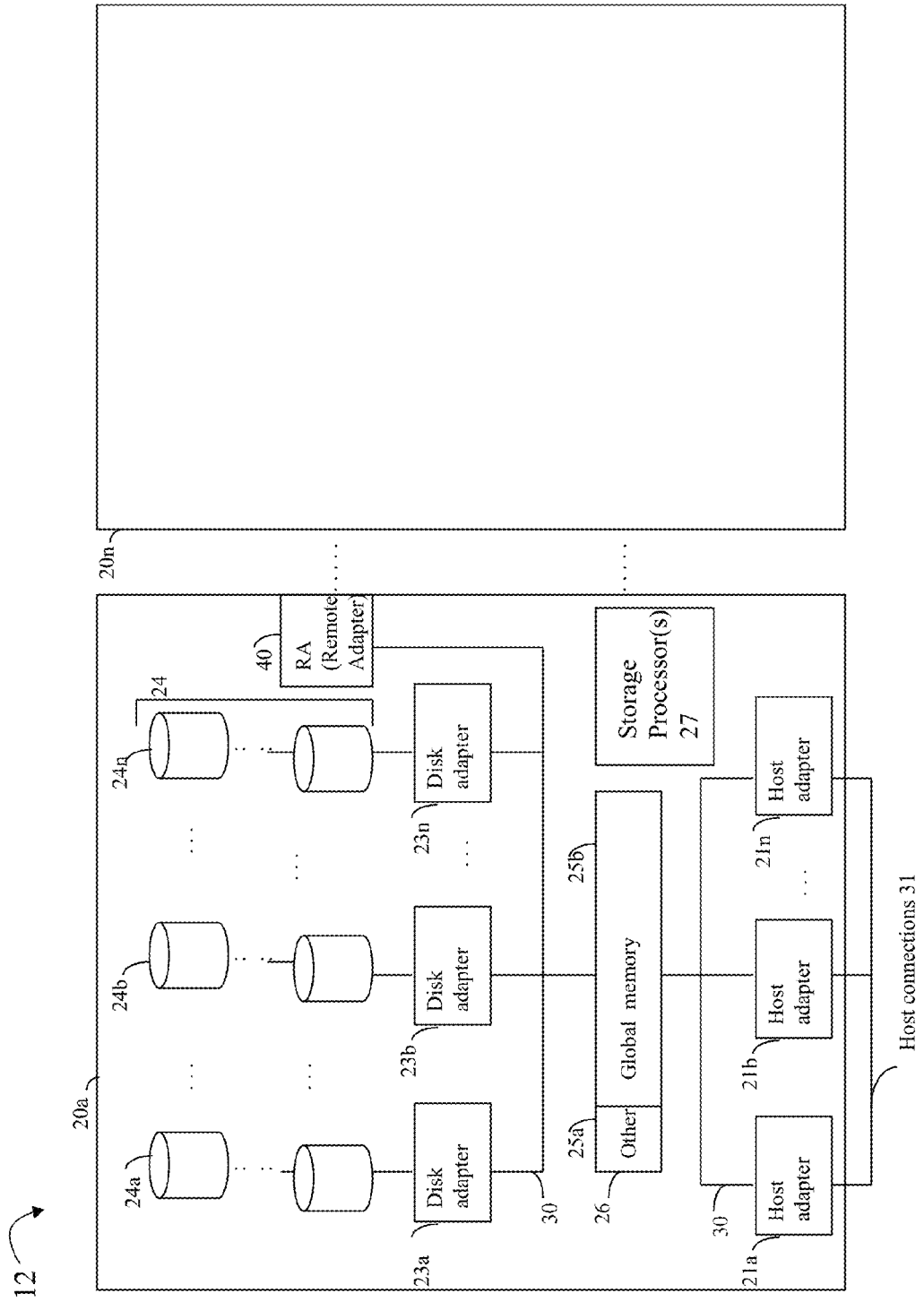

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors (SPs) 27. For example, VNX™ data storage systems, such as the VNX8000™ data storage system, by EMC Corporation includes two storage processors (SPs). Additionally, each of the SPs 27 may include any number of computer processors or "cores". The system 20a may also include one or more host adapters ("HAs") or directors 21a-21n. Each of the HAs may be used to manage communications and data operations between one or more host systems and the global memory. In an embodiment, the HA may be a Fibre Channel Adapter or other front end adapter (FA) which facilitates host communication. The HA communicates with a component of the host such as a host bus adapter (HBA). Generally, directors may also be characterized as the different adapters, such as HAs (including FAs), DAs RAs, and the like, as described herein. RAs (remote adapters) are described in more detail below. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that FIG. 2 generally illustrates components of the data storage system including multiple SPs 27, global memory such as 25b (also referred to herein as main memory accessible to the different adapters and other components of the data storage system), and the like. The global or main memory and SPs may be configured in an embodiment in accordance with techniques herein in any suitable manner. In some embodiments in accordance with techniques herein, the global or main memory 25b of FIG. 2 may be a logical representation of such memory having any suitable physical implementation.

The particular data storage system as described in this embodiment, or a particular data storage device thereof, such as a mechanical rotating disk or SSD storage device, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

It should be noted that the data storage system may include multiple SPs in order to provide for redundancy whereby one of the SPs may be active or primary. In the event the active or primary SP fails or otherwise experiences a degradation thereby entering an unhealthy functional state, the other remaining SP may take over and function as the primary SP. In such a system, various suitable processing may be performed to ensure that each of the SPs has sufficient data and state information to assume the role of active or primary SP.

Generally, software testing is performed as part of the software development process. Software testing may be performed, for example, to test a new code module or to test a code modification that adds a new feature or corrects a reported problem. Such software, or code generated therefrom, may execute on a data storage system, or more generally, any suitable system or component including a processor.

Described in following paragraphs are techniques for software testing. An embodiment in accordance with techniques herein may automatically and accurately identify existing test cases that are relevant to sufficiently test a particular modification to existing software and/or newly added software. The software modification and/or newly added software may be more generally referred to herein as code churn (e.g., code difference or change) that has occurred with respect to two versions of software or code each at a different point in time. Code churn may be generally defined as code that is added, modified, and/or deleted from one version, or point in time, to another. An embodiment in accordance with techniques herein may identify any code churn (e.g., code modules, or portions thereof) for which new additional tests are needed. For example, an embodiment in accordance with techniques herein may use mapping information to identify which code modules, or portions thereof, have been modified or newly added and are also not been covered by any existing test case (e.g., identify new or modified code modules, or portions thereof, which may not be executed and therefore not tested by any existing test case). An embodiment in accordance with techniques herein may also generate a report that identifies results of processing performed. For example, the report may include test execution or runtime results such as which test(s) failed, succeeded, and the like. The report may identify the particular code module(s), or portions thereof, for which additional tests need to be added. For example, such code modules, or portions thereof, may be newly added or modified whereby the newly added or modified portions may include code that is not currently tested (e.g., not executed) using existing test cases. Thus, an embodiment in accordance with techniques herein may ensure that any problem purportedly fixed by a code addition or modification is indeed corrected and that no new problems have been introduced. An embodiment in accordance with techniques herein may ensure that added or modified code is sufficiently tested in an efficient manner and may also identify test case deficiencies (e.g., what new test cases need to be added to provide testing coverage for all code churn). As described in more detail below, an embodiment in accordance with techniques herein may identify code changes, identify, based on mapping information, impacted test cases that test the code changes, execute the impacted test cases, identify code without test coverage, and generate additional mapping information based on the current execution of the impacted test cases. The current mapping information may identify which code is tested or impacted by a particular test case. The additional mapping information may include updated or new mapping information generated as a result of executing the impacted test cases or newly added test cases. Additionally, an embodiment in accordance with techniques herein may identify which test cases failed and may also update the current mapping information based on the additional mapping information just generated.

Figure 2B:
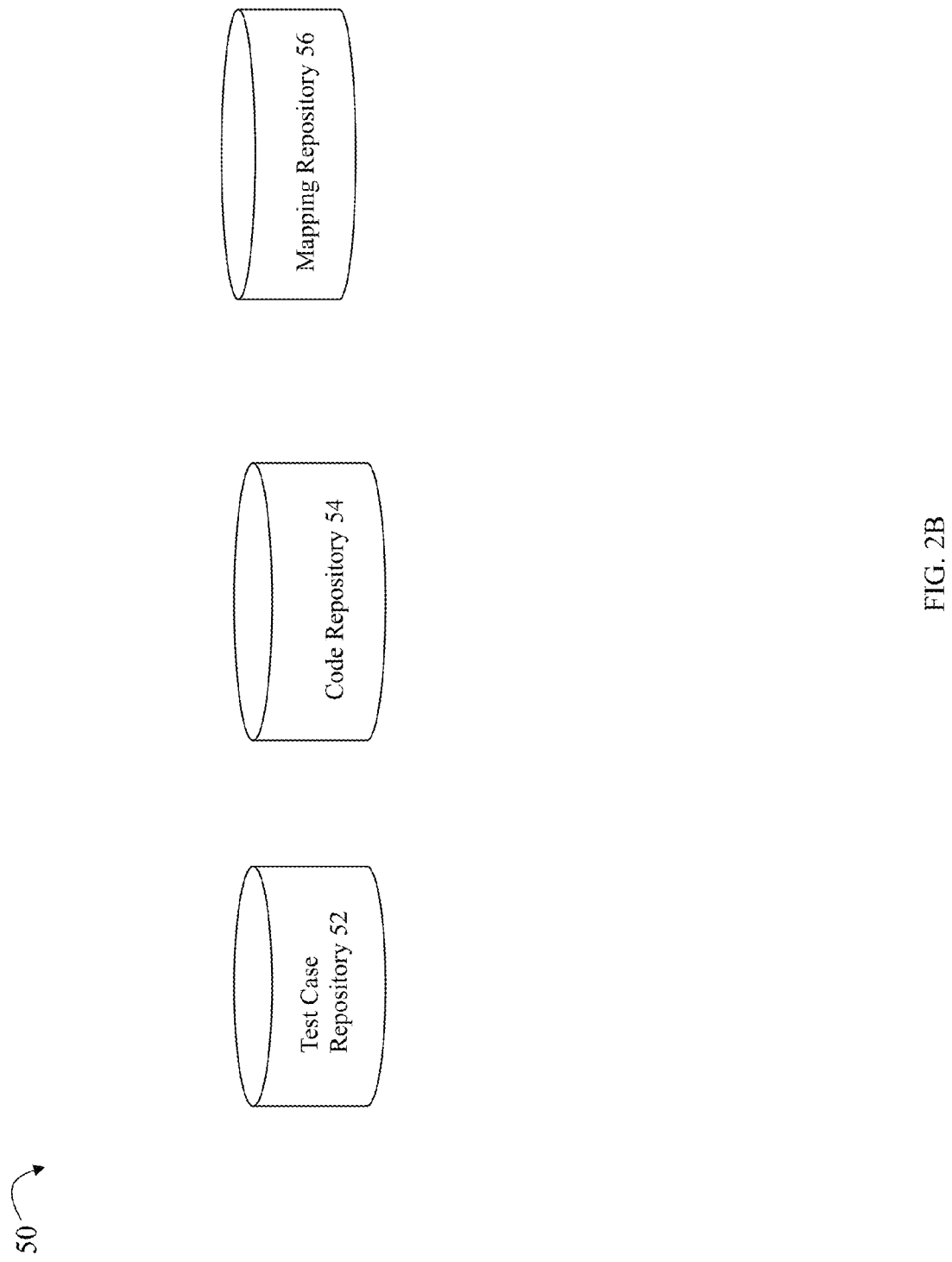
FIG. 2B is an example of data repositories that may be used in an embodiment in accordance with techniques herein.

Referring to FIG. 2B, shown is an example of data repositories that may be used in an embodiment in accordance with techniques herein. The example 50 includes a test case repository 52, a code repository 54, and a mapping repository 56. Although 3 different repositories are illustrated in this particular example, generally, an embodiment may use any suitable number and type of one or more repositories to store data used in connection with techniques herein. Such repositories may include any of a database, files in directories, and the like. For example, in one embodiment, the mapping repository 56 may be a relational database.

The code repository 54 may include code of an existing system such as, for example, code of a software product, application, operating system, and the like. In one embodiment, the code repository 54 may include software modules, such as source code modules, which may be further processed to produce executable code that is executed on a processor. An embodiment in accordance with techniques herein may use a software configuration management (SCM) system or tool to track, control and manage changes made to software. The SCM system may, for example, implement revision control, track changes to code modules by having developers check in code that is newly added or modified, and the like. The SCM system may include functionality that identifies the code churn between two points in time or two revisions. For example, the SCM system may identify the particular code module(s), or portion(s) thereof, that have been added or modified between two points in time. For example, a user performing testing may enter two points in time such as by selecting/inputting two particular dates (e.g., both may be dates prior to a current date/time), two different software versions or revision numbers each having a different date, or a first date that is a previous date or point in time (corresponding to a prior software version) and a second date which may be the current date (corresponding to the latest or current version). Thus, generally, an embodiment in accordance with techniques herein may identify the code churn within a time range. The time range may be manually specified by the user, associated with two versions of code, and the like. The time range may be implicitly specified, for example, when a user checks in one or more code modules whereby the SCM system may automatically determine a time range defined between the current version of the code module(s) just checked in and a prior version of the same code module(s).

The test case repository 52 may generally include data for the different test cases of the test system used to test code. A test case may include input used to test the code such as to execute particular logic paths in the code. Input for a test case may include, for example, a script, one or more commands, and the like, used to test different functionality and features provided by executing different logical runtime execution paths of instructions. For example, code modules of the repository may include code modules that, when further processed (such as by compiling, linking, and the like) generate executable code executed on a data storage system. Thus, test cases of the test case repository 52 may test functions and features performed when issuing commands and performing different data storage system operations. For example, one or more code modules may be used to provision storage for a LUN. A test case may include input(s) (e.g. user interface selections for commands, command parameters, options and values, command lines and options, etc.) for provisioning a LUN (e.g., parameters or options identifying size or capacity of the LUN, a RAID protection level for the LUN, selecting a particular existing RAID group from which to provision physical storage for the LUN, whether the LUN is a virtually provisioned or thin LUN, and the like). As another example, one or more code modules may be used to create and configure a RAID group. As known in the art, a RAID group is group of physical devices configured to have a particular RAID level denoting a level of data protection. For example, a RAID group may be configured as any of RAID-0, RAID-1, RAID-5 or RAID-6 group. A test case for such code may include input(s) (e.g. user interface selections for commands, command parameters, options and values, command lines and options, etc.) for configuring a RAID group (e.g., parameters or options for specifying RAID level, specifying a name or identifier for the RAID group being configured, selecting physical storage device characteristics such as drive types or technologies (flash, rotating drive type (FC, SATA) for the drives used in the RAID group), rotating drive speed (e.g. FC 10K RPM or FC 15K RPM), and the like).

The mapping repository 56 may generally including mapping information identifying which one or more code entities are covered (e.g., tested) by each test case in the test case repository 52. A code entity identified by the mapping information as being covered by a particular test case may denote that execution of the particular test case causes execution of at least some of the code of the associated code entity. Thus, as described in more detail below, the mapping information of 56 may be used to identify a set of one or more tests cases which are impacted by, and relevant to the testing of, a particular code entity. Generally, a code entity may be characterized as a unit of code that may vary with embodiment. A code entity may be, for example, a single code module, a single routine or function (e.g., where a single code module may include multiple routines or functions), and the like. Although examples herein may refer to a particular code entity, such as a code module, having an associate level of granularity, the particular level of granularities and entities supported may vary with embodiment. In an embodiment in accordance with techniques herein, the mapping information of 56 may be used to selectively identify a set of one or more test cases to be executed when testing a particular code entity in order to efficiently and accurately perform such testing, for example, when the code entity is modified.

Figure 3:
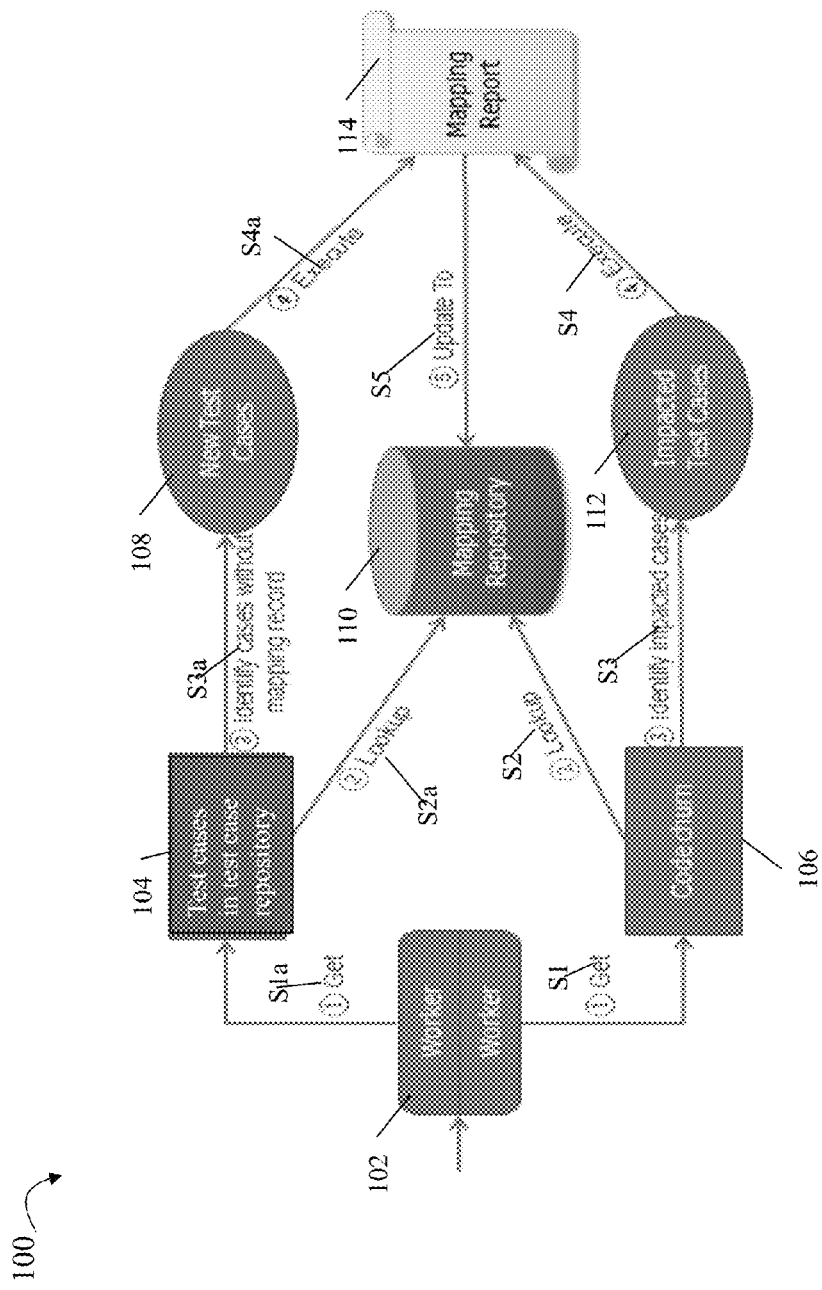
FIGS. 3 and 4 are examples of workflow processing that may be performed in an embodiment in accordance with techniques herein.

Referring to FIG. 3, shown is an example of a work flow diagram 100 outlining processing that may be performed in an embodiment in accordance with techniques herein. Generally, the example 100 illustrates two workflows—a first illustrated by the top portion and a second illustrated by the bottom portion. The top portion of the example 100 illustrating the first workflow may be performed responsive to a first trigger event occurrence. For example, the first trigger event occurrence may be any of a user adding a new test to the test system, a user manually invoking the test system to perform such processing such as through user interface selections and options, and the like. The bottom portion of the example 100 illustrating the second workflow may be performed responsive to a second trigger event occurrence. The second trigger event occurrence may be any of a user checking in new code or a new version of existing code where the new version includes code changes, a user manually selecting to run the test system with respect to code changes within a specified time range, and the like.

The top portion of the example 100 illustrating the first workflow may be performed responsive to a first trigger event some examples of which are provided above and elsewhere herein. For example, when a worker 102 adds one or more new test cases to the test case repository 52, the first workflow processing may be performed. In a first step S1*a*, processing may be performed to determine what test cases (including new test case(s) just added) are currently in test case repository 104. In a second step S2*a*, processing may be performed to obtain current mapping information from the mapping repository 110. In a third step S3*a*, processing may be performed to determine which of the currently existing test cases of the test case repository 104 are without a mapping record in the mapping repository 110. Thus, step S3*a* may determine those test cases without any existing mapping record in mapping repository (e.g., those test cases not mapped to any code entity). In this example, step S3*a* processing identifies each of the one or more new test cases 108 as those without an existing mapping record in the mapping repository 110. In a fourth step S4*a*, processing is performed to execute the new test cases identified as ones without existing mapping information. During such execution of code using the new test cases, runtime execution may be traced and then analyzed to identify what lines of code are executed for each of the particular new test cases and generate runtime coverage information. The runtime coverage information may identify, for example, what lines of code were executed for each of the new test cases. Step S4*a* may also include analyzing the coverage information to identify the particular code modules, functions or routines, and the like, that had code executed using each of the new test cases as indicated by the coverage information. Step S4*a* may include generating a mapping report 114 which includes additional mapping information identifying any new relationship between the new test case and the one or more code entities executed (in step S4*a*) as a result running the new test case. The mapping report 114 may also identify which of the new test cases run in step S4*a* failed. The mapping report 114 may also identify which code entities, if any, are not covered by any test case (e.g., which code entities were not executed (in step S4*a*) as a result of one of the new test cases or do not otherwise have a mapping entry in the current mapping information of the mapping repository). In step S5*a*, processing may be performed to update the mapping repository with any new mapping information of the mapping report generated as a result of executing (S4*a*) the one or more new test cases added. In step S5*a*, one or more new entries may be added to the mapping information of the mapping repository 110 where each such entry may identify a code entity and an associated new test case that impacts (e.g., tests or covers) the code entity.

It should be noted that the coverage report generated as noted above and elsewhere herein may be automatically generated using a software coverage tool that performs a runtime execution trace of what lines of code are executed for a given test case. The particular coverage tool used may vary with embodiment and may be any suitable code coverage tool selected for use with the particular language of the code being executed.

The bottom portion of the example 100 illustrating the second workflow may be performed responsive to a second trigger event some examples of which are provided above and elsewhere herein. For example, when a worker 102 checks in a new code module or a new version of an existing code module (e.g. where the new version include code changes or modifications from the current existing code module), the second workflow processing may be performed. In a first step S1, processing may be performed to determine the code churn 106 or code that has been changed. Step S may include identify a set of one or more code entities that have been modified or newly added. The set of entities may include modules, functions, and the like, that have been changed (e.g. modified and/or added). The particular code entities identified may vary with the supported level of the mapping information granularity in an embodiment. In a second step S2, processing may include obtaining current mapping information from the mapping repository 110. In a third step S3, processing may determine which of the currently existing test cases are associated with the identified code entities of the code churn using the current mapping information. Step S3 may, for example, identify entries of mapping information of 110 having a code entity that matches a code entity of the churned code set from step A1. The one or more test cases of the one or more identified matching entries (from step S3) may form a set of test cases that may also be referred to as impacted test cases. It should be noted that the foregoing selected portion of one or more test cases may each be characterized as impacted by the code churn 106 (e.g., each identified test case is identified, based on the mapping information of 110, as being relevant to testing code of the associated code entity). In a fourth step S4, processing is performed to execute code using the selected portion of impacted test cases. During such execution of code in step S4 using the impacted test cases, runtime execution may be traced and then analyzed to identify what lines of code are executed for each of the impacted test cases and generate runtime coverage information. The runtime coverage information may identify, for example, what lines of code were executed. Step S4 may also include analyzing the coverage information to identify the particular code entities (e.g., code modules, functions or routines, and the like) that actually had code executed using the impacted test cases as indicated by the coverage information. Step S4 may include generating a mapping report 114 which includes additional mapping information identifying any new or updated relationship between an impacted test case and the one or more code entities executed (in step S4) as a result of running the impacted test case. The mapping report 114 may also identify which of the impacted test cases run in step S4 failed. The mapping report 114 may also identify which code entities (such as those of code churn 106) are not covered by any test case (e.g., which code entities of the code churn have no mapping entry in the additional mapping information generated as a result of performing step S4). In step S5, processing may be performed to update the mapping repository with any new or updated mapping information of the mapping report generated as a result of executing the one or more new test cases added. In step S5*a*, one or more new entries may be added to the mapping information of the mapping repository 110 where each such entry may identify a code entity and an associated impacted test case of 112 that impacts (e.g., tests or covers) the code entity.

Generally, processing performed in step S5 may include modifying an existing entry of mapping information in the mapping repository 110 and/or adding one or more new entries to the mapping information of mapping repository 110 based on the additional mapping information of 114. For example, the code churn 106 may include a modification to an existing code module 1. Before the code change to module 1, the mapping repository may include mapping information indicating test case 1 is impacted (e.g., test case 1 is used to test module 1 whereby execution of test case 1 causes execution of module 1). Thus, processing performed to test the modified module 1 in step S4 includes executing test case 1, and performing coverage analysis of the code executed. After the code change to module 1, it may be that test case 1 no longer impacts execution of module 1 (e.g., execution of test case 1 does not cause execution of any code in module 1). Therefore, analysis of the generated coverage information as in step S4 determines that the now modified module 1 was not actually executed using test case 1 as identified in the current set of mapping information. Thus, the current mapping information in 110 is outdated and accordingly updated in step S5. In this case, the mapping information of 110 may be updated to 1) remove the entry indicating that module 1 is impacted by test case 1, and 2) add an entry and generate a report indicating module 1 (as now modified) is currently not mapped to any test case (e.g., module 1 is not covered by a test case).

As another example, the code churn 106 may include a modification to an existing code module 1 and a new code module 2. At this point, the mapping repository may not include any mapping information for module 2 and may include mapping information for module 1. Before the code change to module 1, the mapping repository may include mapping information indicating test case 1 is impacted (e.g., test case 1 is used to test module 1 whereby execution of test case 1 causes execution of module 1). Thus, processing performed to test the modified module 1 in step S4 includes executing test case 1, and performing coverage analysis of the code executed. After the code change to module 1, it may be that test case 1 no longer impacts execution of module 1 (e.g., execution of test case 1 does not cause execution of any code in module 1). Therefore, analysis of the generated coverage information as in step S4 determines that module 1 (as now modified) was not executed using test case 1 as identified in the current set of mapping information. Additionally, the analysis may also indicate that a different module, the new module 2, was actually executed as a result of using test case 1 in step S4. Thus, the current mapping information in 110 is outdated and accordingly updated in step S5. In this case, the mapping information of 110 may be updated to 1) remove the entry indicating that module 1 is impacted by test case 1, and 2) add an entry and generate a report indicating module 1 (as now modified) is currently not mapped to any test case (e.g., module 1 is not covered by a test case), and also 3) add an entry indicating that module 2 is impacted by test case 1.

Figure 4:
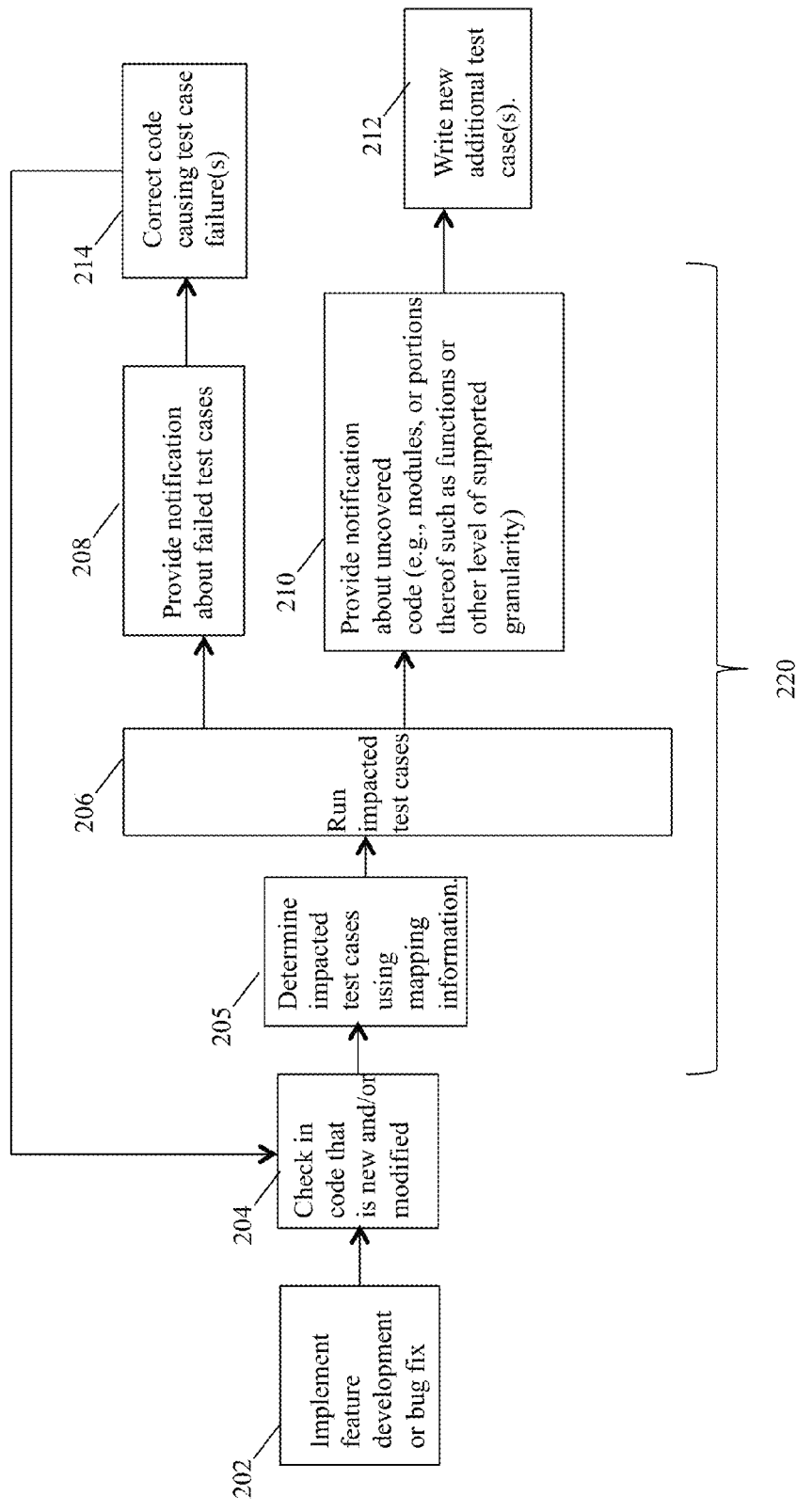

Referring to FIG. 4, shown is an example of software development processing which utilizes a system embodying techniques described herein. The example 200 generally outlines processing steps that may be performed by a developer using a test system embodying techniques described herein. In step 202, a software developer may implement a development feature or fix a bug. Step 202 may include adding and/or modifying a code entity, For example, step 202 may include any of modifying an existing code module, modifying an existing function modifying an existing routine, adding a new code module, adding a new routine, adding a new function, and the like. Step 204 may include the developer checking in the code that is new and/or modified as a result of step 202. Responsive to step 204, an embodiment of a system in accordance with techniques herein may automatically perform steps of 220. Steps of 220 may include may include processing performed by an embodiment of an automated test system as described herein. In step 205, impacted test cases may be determined based on mapping information. In step 206, the impacted test cases for the code checked-in are executed. In step 208, notification is provided regarding failed test cases. In step 210, notification is provided regarding uncovered code. Step 210 may identify, for example, the code modules and/or other code entities (e.g., such as functions or routines or other supported code entity level of granularity) of the code churn associated with 204 that are not covered by any test case (e.g., code entities associated with the code churn that are not executed by an impacted test case in 206). In step 212, the developer may write one or more additional new test cases for those uncovered code entities identified in step 210. Although not illustrated in FIG. 4, the developer may add the new test cases to the test system as described in connection with FIG. 3 whereby the first workflow processing described above is performed. Additionally, after executing step 206, notification may be provided in step 208 regarding any failed test cases. Responsive to step 208, the developer may add a coding correction with one or more code entities (e.g. modules, functions, routines, and the like) that are new or modified to correct the test case failure(s) (as identified in step 208). From step 214, processing beginning with step 204 may be repeated for the coding correction implemented in step 214.

It should be noted that in connection with processing described in connection with FIG. 4 and elsewhere herein, if a new code entity is added, there is no mapping information information and thus techniques herein provide notification that there is no existing mapping information for the new code entity so that a developer may add one or more additional test cases. Additionally, even though a first code entity may be covered by an existing test case, it may be that the existing test case has not yet been run and thus there is no mapping information for the existing test case. In this case, techniques herein provide for automatically running the existing test case, generating additional corresponding mapping information (mapping the existing test case to the first code entity), and updating the mapping repository with the additional mapping information. As also described herein, when a new code entity is added, it may be that some existing test cases are executed which code the new code entity. In this case, running the existing test cases result in generating updated mapping information which map the existing test cases to the new code entity.

Referring to FIG. 5A, shown is a first example of mapping information that may be included in the mapping repository and used in an embodiment in accordance with techniques herein. The example 300 includes mapping information 310 in tabular form although any suitable data structure may be used. The table of mapping information 310 includes a first column of code entities 312 and a second column of test cases 314. Each row of 310 identifies a code module in column 312 of the row and an associated test case in column 314 of the row denoting that the test case is impacted by, or used to test, the code module. For example, the first row indicates that test case 1 is impacted by code module 1 (e.g., test case 1 is executed to test code module 1). The second row indicates that test case 7 is impacted by code modules 2 (e.g., test case 7 is executed to test code module 2). The example 300 illustrates mapping information that may be used in an embodiment where the supported code entity level of granularity is per code module.

Some embodiments may support a finer code entity level of granularity than at the code module level. For example, an embodiment may provide support at the function or routine level of granularity where there may be one or more functions or routines in a single code module. An embodiment may generally include and support multiple levels of granularity (e.g., module and function or routine level) as well as other levels depending on the particular code entities in an embodiment (e.g., vary with programming language and scoping constructs).

Figure 5B:
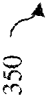

Referring to FIG. 5B, shown is a second example of mapping information that may be included in the mapping repository and used in an embodiment in accordance with techniques herein. The example 400 includes mapping information 410 in tabular form although any suitable data structure may be used. The table of mapping information 410 includes a first column of code entities 412 and a second column of test cases 414. Each row of 410 identifies a function or routine in column 412 of the row and an associated test case in column 314 of the row denoting that the test case is impacted by, or used to test, the function or routine. For example, the first row indicates that test case 1 is impacted by function or routine 1 (e.g., test case 1 is executed to test function or routine 1). The second row indicates that test case 7 is impacted by function or routine 2 (e.g., test case 7 is executed to test function or routine 2). The example 400 illustrates mapping information that may be used in an embodiment where the supported code entity level of granularity is per function or routine.

It should also be noted that the mapping information generated as described in connection with the first and second workflows of FIG. 3 (e.g., based on executing a selected set of impacted test cases or new test cases) may also have a form and include information similar to the entries or pairs of code entities and test cases of FIGS. 5A and 5B.

Thus, an embodiment in accordance with techniques herein may run a selected portion of one or more existing tests impacted by modified code entities (based on mapping information). Such techniques may be used to generally identify code entities, such as those affected by a code churn, not covered any test case (e.g., which new and/or modified existing code modules are not executed for a selected set of impacted cases). Such techniques described herein may identify any new mappings and/or changes to current mapping information due to a code change or newly added test.

When adding a new test, an embodiment in accordance with techniques herein may identify and verify impacted code. For example, a developer may develop and add a test case to test code module 1. When processing is performed by an embodiment in accordance with techniques, automatically generated mapping information may indicate, and thus verify, that code module 1 is executed. Additionally, the generated mapping information for the added test case may also indicate that a second code module 2 is also executed. The developer may have been unaware of the fact that, although he or she may have customized the test case to specifically test the code module 1, code module 2 is also executed or impacted as a result of running the test case.

It should be noted that some embodiments may associate a particular set of mapping information for a code entity with a particular version or revision of the code entity. In such an embodiment, the mapping information of the mapping repository may indicate which particular version(s) or revision(s) of a code entity are associated with a particular test case. For example, as described elsewhere herein, a first version of module 1 may be impacted by test case 1 and test case 2. The first version of module 1 may be modified to generate a second version of module 1. Using techniques herein, the second version of module 1 may no longer be impacted by test case 1 but is still impacted by test case 2. Additionally, a new test case 3 may be added which only impacts the second version of module 1 but not the first version of module 1. Thus, the mapping information of the mapping repository may denote the foregoing relationships between impacted test cases and particular version of module 1. Alternatively, in some embodiments, mapping information may be associated with only a single version of a code entity that is the latest version of the code entity. In this case, the mapping information need not denote any particular version of the code entity if it is implied as always being the current or latest version of the code entity.

What will now be described are flowcharts that may be performed in an embodiment in accordance with techniques herein that generally summarize processing described above.

Figure 6:
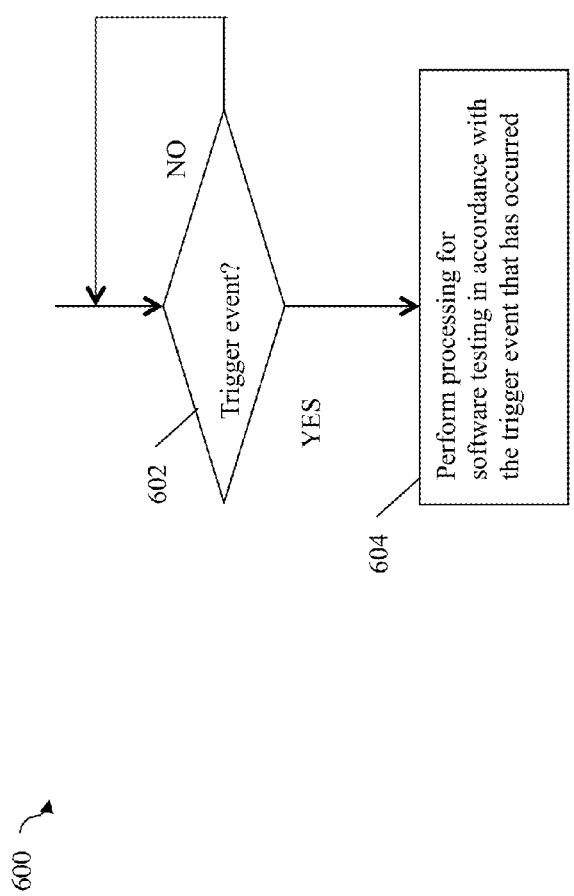
FIGS. 6, 7, 8, and 9 are flowcharts of processing steps that may be performed in an embodiment in accordance with techniques herein.

Referring to FIG. 6, shown is a first flowchart 600 of processing steps that may be performed in an embodiment in accordance with techniques herein. At step 602, a determination is made regarding whether a trigger event has occurred. Examples of trigger events causing processing are described elsewhere herein. Processing remains at step 602 until step 602 evaluates to yes. Once step 602 evaluates to yes, control proceeds to step 604 to perform processing for software testing in accordance with the particular trigger event that has occurred.

Figure 7:
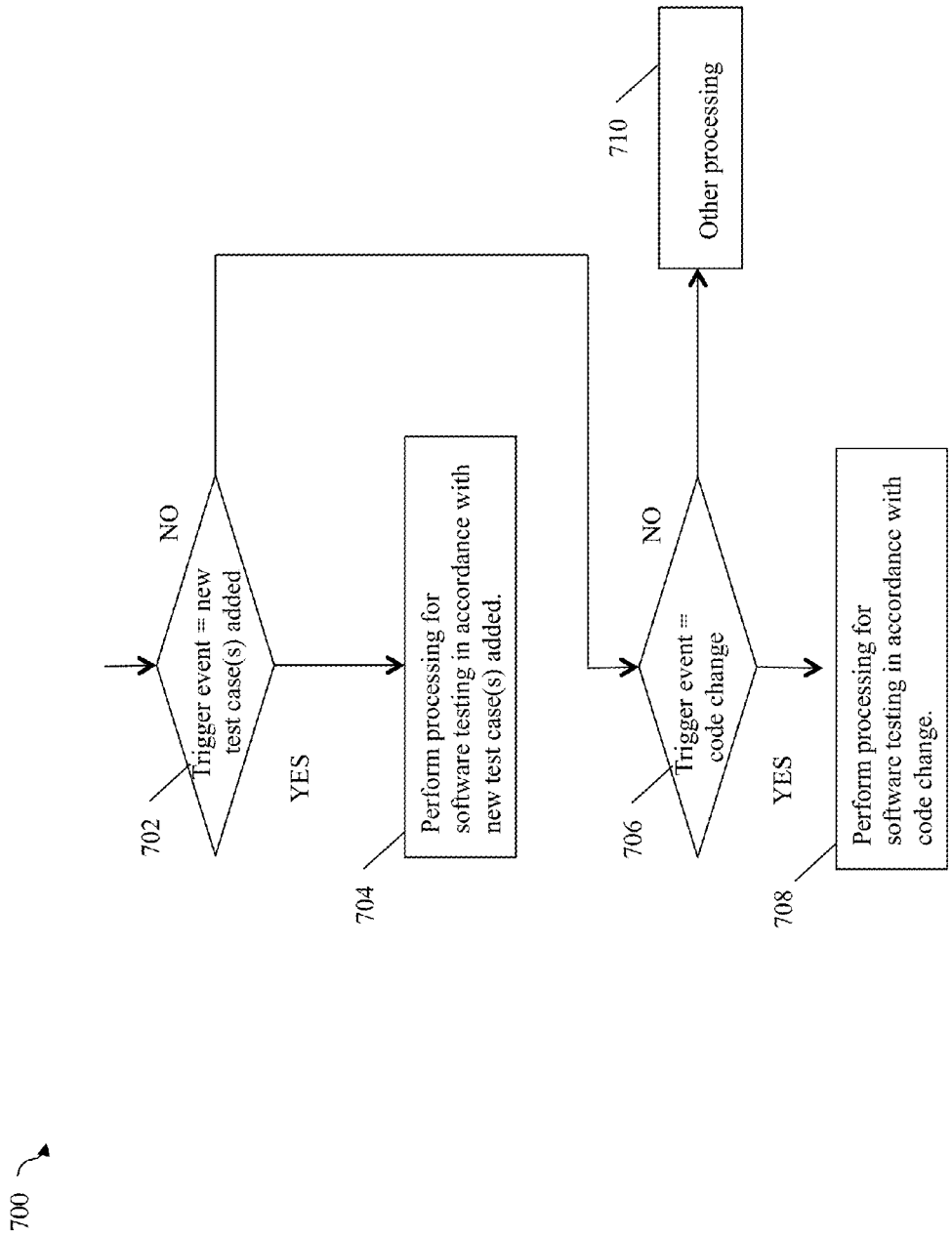

Referring to FIG. 7, shown is a second flowchart of processing steps that may be performed in an embodiment in accordance with techniques herein. The flowchart 700 provides additional detail regarding the processing generally described in connection with step 604 of the first flowchart 600 of FIG. 8 responsive to the occurrence of a trigger event. At step 702, a determination is made as to whether the trigger event is a first trigger event such as adding a new test case as described above. If step 702 evaluates to yes, control proceeds to step 704 to perform processing for software testing in accordance with the first trigger event which, in this example, is adding one or more new test cases. If step 702 evaluates to no, control proceeds to step 706 where a determination is made as to whether the trigger event is a second trigger event such as a code change with checking in one or more new or modified code entities as described above. If step 706 evaluates to yes, control proceeds to step 708 to perform processing for software testing in accordance with the second trigger event which, in this example, is a code change. If step 706 evaluates to no, control proceeds to step 710 to generally perform other processing. Step 710 may include performing other software testing responsive to other trigger events than those described herein.

Figure 8:
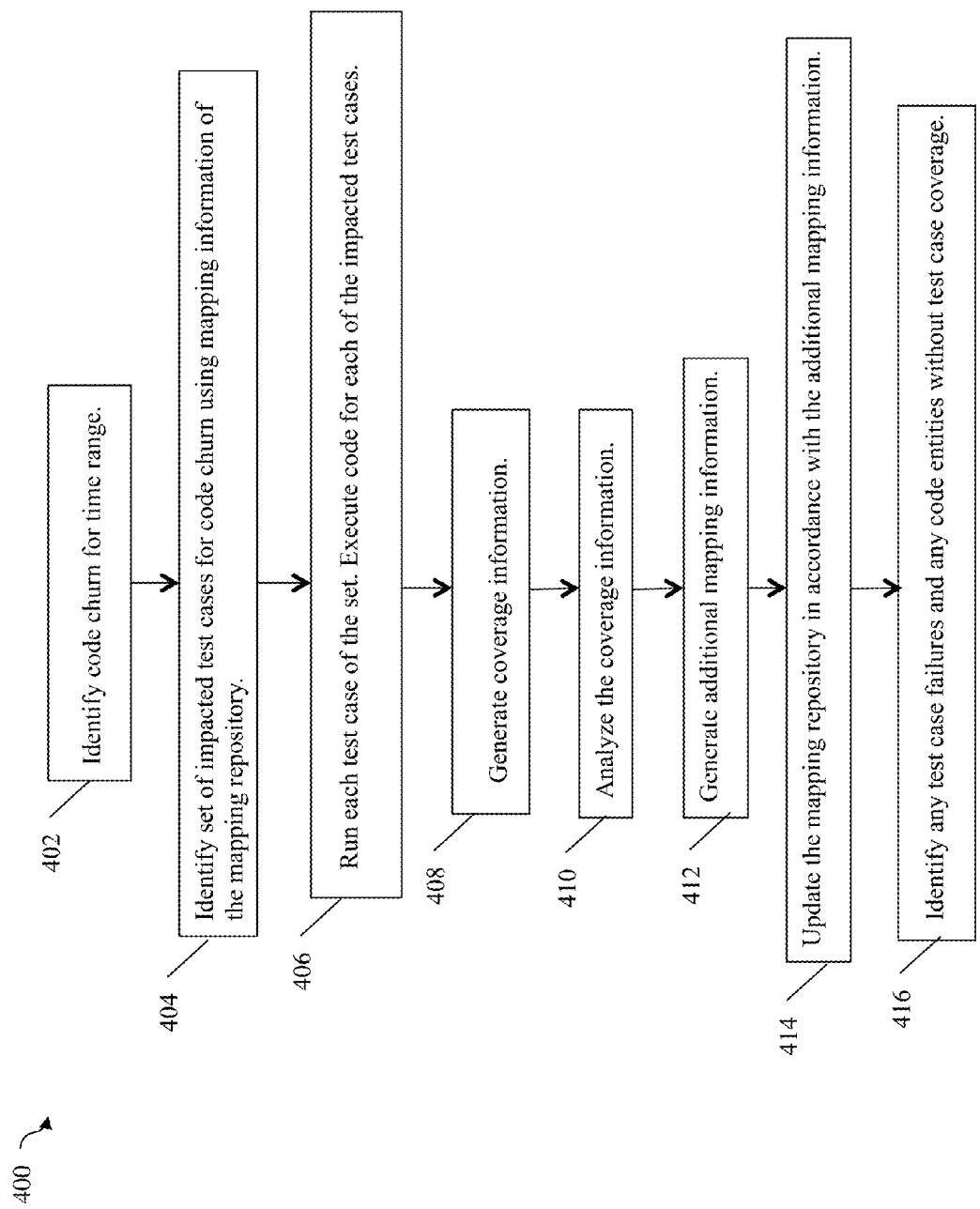

Referring to FIG. 8, shown is a third flowchart of processing steps that may be performed in an embodiment in accordance with techniques herein. The flowchart 400 generally outlines processing of the second workflow described elsewhere herein in connection with FIG. 3 and also additional detail regarding step 708. At step 402, a code churn may be identified for a particular time range. At step 404, a set of impacted test cases for the code churn is identified using the mapping information of the mapping repository. At step 406, each test case of the set identified in step 404 is run whereby code is executed for each of the impacted test cases. At step 408, coverage information is generated which includes information regarding the current runtime execution path for each test case (e.g., trace the code executed for each test case). At step 410, the coverage information is analyzed. As described herein such analysis may indicate, for example, which one or more code entities are executed for each test case, At step 412, additional mapping information is generated. The additional mapping information may identify which one or more code entities were executed in step 406 for each test case and which code entities (if any) of the code churn are not covered by any test case (e.g. which code entities of the code churn were not executed as a result of running the test cases in step 406). At step 414, the mapping repository is updated in accordance with additional mapping information. At step 416, the user may be notified regarding any test case failures and any code entities of the code churn without test case coverage.

Figure 9:
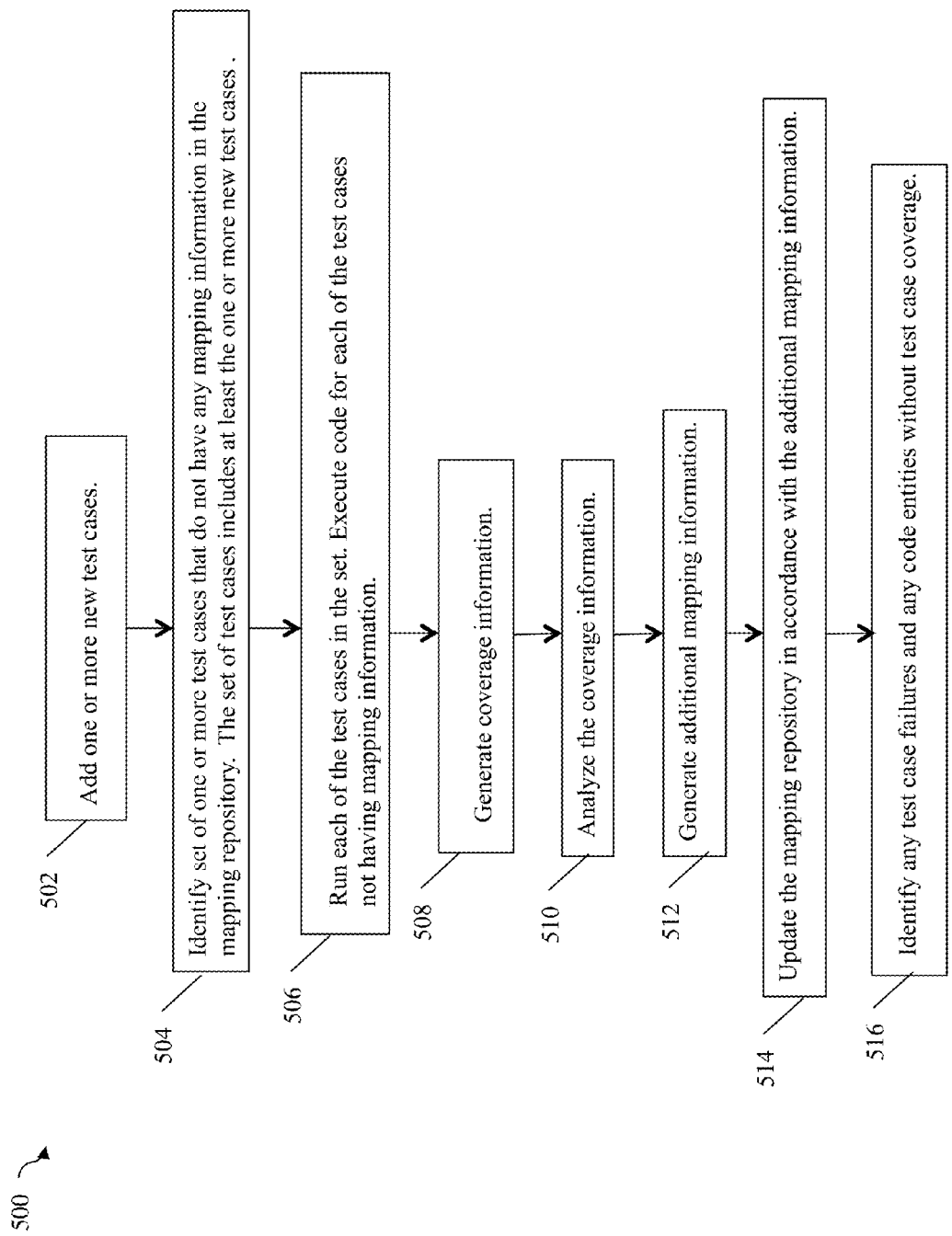

Referring to FIG. 9, shown is a fourth flowchart of processing steps that may be performed in an embodiment in accordance with techniques herein. The flowchart 500 generally outlines processing of the first workflow described elsewhere herein in connection with FIG. 3 and also additional detail regarding step 704. At step 502, one or more new test cases may be added to the test system. At step 504, processing is performed to generally identify as set of one or more test cases that do not have any mapping information in the mapping repository (e.g., which test case is not mapped to any code entity). In this case, the set of test cases includes the one or more new test cases added in step 502. In step 506, each test case of the set identified in step 504 is run whereby code is executed for each of the newly added test cases. At step 508, coverage information is generated which includes information regarding the current runtime execution path for each test case (e.g., trace the code executed for each test case from step 506). At step 510, the coverage information is analyzed. As described herein such analysis may indicate, for example, which one or more code entities are executed for each new test case. At step 512, additional mapping information is generated which describes the one or more code entities executed for each new test case added.

The additional mapping information may identify which one or more code entities were executed in step 506 for each new test case and which code entities of the code repository are not covered by any test case (e.g. which code entities do not have mapping information currently in the mapping repository or were otherwise not executed as a result of running the new test cases in step 506). At step 514, the mapping repository is updated in accordance with additional mapping information. At step 516, the user may be notified regarding any test case failures and any code entities of the code repository without test case coverage.

An embodiment may implement the techniques herein using code executed by a processor. For example, an embodiment may implement the techniques herein using code which is executed by a processor of a system, such as the data storage system, management system, or more generally, any computer system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media (or computer readable media) includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method of testing software comprising:
   identifying, at a first point in time, first code that has been modified;
   identifying, using first mapping information, a testing set of one or more test cases wherein the first mapping information identifies each test case of the testing set as a test case used to test the first code, wherein said first mapping information is generated based on runtime code coverage information obtained from previously executing each test case of the testing set;
   running the testing set, wherein said running includes executing second code in accordance with the testing set;
   generating coverage information in accordance with said executing the second code;
   analyzing the coverage information;
   generating second mapping information in accordance with said analyzing of the coverage information generated as a result of executing the second code;
   updating the first mapping information in accordance with the second mapping information;
   identifying, in accordance with the second mapping information, at least one code entity of the first code that is not covered by at least one test case whereby the second mapping information indicates that there is no current test case for testing the at least one code entity, wherein the at least one code entity of the first code not covered by at least one test case includes a first code entity;
   adding a new test case to test the first code entity;
   executing code in accordance with the new test case;
   generating second coverage information in accordance with said execution in accordance with the new test case;
   analyzing the second coverage information;
   generating third mapping information in accordance with said analyzing the second coverage information; and
   updating the first mapping information in accordance with the third mapping information, said third mapping information identifying the new test as causing execution of the first code entity; and responsive to a first trigger event, performing other processing comprising:
      identifying an existing test case without mapping information wherein no code is identified as being executed by the existing test case;
      responsive to identifying the existing test case without mapping information, executing the existing test case and determining what code is executed by the existing test case; and
      generating, in accordance with said executing, additional mapping information for the existing test case, said additional mapping information identifying what code is executed by the existing test case.

2. The method of claim 1, wherein the first code includes any of a code module, a routine, a function, multiple code modules, multiple functions, and multiple routines.

3. The method of claim 1, wherein the coverage information identifies what one or more portions of code are executed in said executing the second code.

4. The method of claim 1, wherein the second code includes the first code, wherein said executing the second code includes executing the first code, and wherein said executing the second code further includes:
   executing the second code in accordance with a first test case of the testing set, and wherein the second mapping information indicates that said executing the second code in accordance with the first test case causes execution of at least some of the first code.

5. The method of claim 1, wherein the second code does not include the first code whereby said executing does not include executing any of the first code, wherein the first mapping information indicates that a first test case should cause execution of the first code, and wherein said executing the second code further includes:
   executing the second code in accordance with the first test case of the testing set, and wherein the second mapping information indicates that said executing the second code in accordance with the first test case does not cause execution of any of the first code; and
wherein said updating further includes:
   modifying the first mapping information to generate first modified mapping information
   that indicates the first test case does not cause execution of the first code.

6. The method of claim 5, further comprising:
   identifying, at a second point in time subsequent to the first point in time, that the first code that has been further modified;
   identifying, using the first modified mapping information, a second testing set of one or more test cases wherein the first modified mapping information identifies each test case of the second testing set as a test case used to test the first code, wherein the second testing set does not include the first test case;

running the second testing set, wherein said running the second test set includes executing third code in accordance with the second testing set;
generating additional coverage information in accordance with said executing in accordance with the second testing set;
analyzing the additional coverage information;
generating fourth mapping information in accordance with said analyzing the additional coverage information; and
updating the first modified mapping information in accordance with the fourth mapping information.

7. The method of claim 1, wherein the first code identified at the first point in time has been modified by performing any of removing a code portion, adding a new code portion, modifying an existing code portion, and adding a new code entity that is any of a module, routine and function.

8. The method of claim 1, further comprising:
identifying any test case of the testing set that failed during said executing.

9. The method of claim 1, further comprising:
checking in the first code that includes modified code at the first point in time, wherein responsive to said checking in, first processing is performed, said first processing including:
said identifying the testing set;
said executing;
said generating the coverage information;
said analyzing the coverage information;
said generating the second mapping information; and
said updating the first mapping information.

10. The method of claim 1, wherein the first mapping information is included in a mapping repository, the first code and the second code are included in a code repository, and each of the test cases of the testing set is retrieved from a test case repository.

11. The method of claim 1, wherein said executing the second code includes executing the first code, and wherein the first code, when executed, performs a data storage operation including any of provisioning storage for a logical device and configuring a RAID (redundant array of independent disks) group, and wherein a first test case of the testing set includes one or more inputs used to perform the data storage operation.

12. A system comprising:
a processor;
a memory comprising code stored therein that, when executed by a processor, performs a method comprising:
identifying, at a first point in time, first code that has been modified;
identifying, using first mapping information, a testing set of one or more test cases wherein the first mapping information identifies each test case of the testing set as a test case used to test the first code, wherein said first mapping information is generated based on runtime code coverage information obtained from previously executing each test case of the testing set;
executing second code in accordance with the testing set;
generating coverage information in accordance with said executing the second code;
analyzing the coverage information;
generating second mapping information in accordance with said analyzing of the coverage information generated as a result of executing the second code;
updating the first mapping information in accordance with the second mapping information;
identifying, in accordance with the second mapping information, at least one code entity of the first code that is not covered by at least one test case whereby the second mapping information indicates that there is no current test case for testing the at least one code entity, wherein the at least one code entity of the first code not covered by at least one test case includes a first code entity;
adding a new test case to test the first code entity;
executing code in accordance with the new test case;
generating second coverage information in accordance with said executing in accordance with the new test case;
analyzing the second coverage information;
generating third mapping information in accordance with said analyzing the second coverage information; and
updating the first mapping information in accordance with the third mapping information, said third mapping information identifying the new test as causing execution of the first code entity; and responsive to a first trigger event, performing other processing comprising:
identifying an existing test case without mapping information wherein no code is identified as being executed by the existing test case;
responsive to identifying the existing test case without mapping information, executing the existing test case and determining what code is executed by the existing test case; and
generating, in accordance with said executing, additional mapping information for the existing test case, said additional mapping information identifying what code is executed by the existing test case.

13. A non-transitory computer readable medium comprising code stored thereon that, when executed, performs a method comprising:
identifying, at a first point in time, first code that has been modified;
identifying, using first mapping information, a testing set of one or more test cases wherein the first mapping information identifies each test case of the testing set as a test case used to test the first code, wherein said first mapping information is generated based on runtime code coverage information obtained from previously executing each test case of the testing set;
running the testing set, wherein said running includes executing second code in accordance with the testing set;
generating coverage information in accordance with said executing the second code;
analyzing the coverage information;
generating second mapping information in accordance with said analyzing of the coverage information generated as a result of executing the second code;
updating the first mapping information in accordance with the second mapping information;
identifying, in accordance with the second mapping information, at least one code entity of the first code that is not covered by at least one test case whereby the second mapping information indicates that there is no current test case for testing the at least one code entity, wherein the at least one code entity of the first code not covered by at least one test case includes a first code entity;

adding a new test case to test the first code entity;
executing code in accordance with the new test case;
generating second coverage information in accordance with said executing in accordance with the new test case;
analyzing the second coverage information;
generating third mapping information in accordance with said analyzing the second coverage information; and
updating the first mapping information in accordance with the third mapping information, said third mapping information identifying the new test as causing execution of the first code entity; and responsive to a first trigger event, performing other processing comprising:
identifying an existing test case without mapping information wherein no code is identified as being executed by the existing test case;
responsive to identifying the existing test case without mapping information, executing the existing test case and determining what code is executed by the existing test case; and
generating, in accordance with said executing, additional mapping information for the existing test case, said additional mapping information identifying what code is executed by the existing test case.

14. The non-transitory computer readable medium of claim 13, wherein the first code includes any of a code module, a routine, a function, multiple code modules, multiple functions, and multiple routines.

15. The non-transitory computer readable medium of claim 13, wherein the coverage information identifies what one or more portions of code are executed in said executing the second code.

16. The non-transitory computer readable medium of claim 13, wherein the second code includes the first code, wherein said executing the second code includes executing the first code, and wherein said executing the second code further includes:
executing the second code in accordance with a first test case of the testing set, and wherein the second mapping information indicates that said executing the second code in accordance with the first test case causes execution of at least some of the first code.

17. The non-transitory computer readable medium of claim 13, wherein said executing the second code includes executing the first code, and wherein the first code, when executed, performs a data storage operation including any of provisioning storage for a logical device and configuring a RAID (redundant array of independent disks) group, and wherein a first test case of the testing set includes one or more inputs used to perform the data storage operation.

\* \* \* \* \*